(12) United States Patent
Cottone et al.

(10) Patent No.: US 6,303,164 B2
(45) Date of Patent: Oct. 16, 2001

(54) EDIBLE BUBBLE MAKING COMPOSITION AND CHILD'S TOY

(75) Inventors: Sam Cottone, Wooddale; Irving Isaac Domsky, Chicago; Hamid Hussain, Carol Streams, all of IL (US)

(73) Assignee: Amron Development, Inc., Woodbury, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/719,776

(22) Filed: Sep. 25, 1996

Related U.S. Application Data

(63) Continuation-in-part of application No. 08/395,624, filed on Feb. 28, 1995, now abandoned.

(51) Int. Cl.$^7$ .............................. A23G 3/00; A63H 33/28; B01F 17/00; C11D 1/66
(52) U.S. Cl. .......................... 426/104; 426/548; 426/658; 446/15; 516/18
(58) Field of Search ..................... 426/104, 573, 426/575, 576, 548, 658, 329, 564; 252/307, 312, 352, 174.17; 446/15; 516/18

(56) References Cited

U.S. PATENT DOCUMENTS

| | | | | |
|---|---|---|---|---|
| 4,126,563 | * | 11/1978 | Barker .............................. | 252/307 X |
| 4,511,497 | * | 4/1985 | Ehrlich ........................ | 252/174.17 X |
| 4,668,422 | * | 5/1987 | Malik et al. .................... | 252/174.17 |
| 4,966,779 | * | 10/1990 | Kirk ................................. | 252/312 X |

OTHER PUBLICATIONS

Whistler et al, *Industrial Gums*, $2^d$ edition, pp. 490–492, Au 1761, 1973.*

* cited by examiner

*Primary Examiner*—Arthur L. Corbin
(74) *Attorney, Agent, or Firm*—Brian K. Dinicola

(57) ABSTRACT

An aqueous bubble-forming composition, suitable for use as a child's toy, comprises a sucrose ester present in an amount by weight from about 3.3% to about 5.3%, a water soluble polymer in an amount by weight of from about 11.5% to about 14.0%, sweetener in amount by weight of from about 1.8% to about 4.0%, and water in amount by weight of from about 75% to about 83%. Small amounts of additional flavorings may be added to further improve the taste of the obtained solution.

19 Claims, No Drawings

EDIBLE BUBBLE MAKING COMPOSITION AND CHILD'S TOY

Amend the specification by inserting before the first line, the sentence (entire genealogy should be set forth): This is a continuation-in-part, of U.S. application Ser. No. 08/395,624, filed Feb. 28. 1995 and entitled EDIBLE BUBBLE MAKING COMPOSITION, now abandoned.

FIELD OF THE INVENTION

The present invention relates generally to bubble making solutions for use as a childrens toy and, more particularly, to bubble making solutions formulated with a surfactant having a taste which can be masked by the addition of a sweetening additive so that pleasant tasting bubbles can be formed therewith.

BACKGROUND OF THE INVENTION

Bubbles of various sizes are blown by small children using an apertured wand structure dipped in a water solution comprising soap or another surfactant. A great variety of bubble solution formulations have been suggested to feature special effects in bubble making. There are solutions for making large bubbles, "long lasting" bubbles, deep colored bubbles, split bubbles, self-healing bubbles, multiple bubbles, vanishing bubbles, flaking bubbles, bursting bubbles, high and/or far-flying bubbles, sinking bubbles etc. In general, many anionic, non-ionic or amphoteric aqueous solutions with low surface tension lend themselves to bubble or foam-making when air or other gases are blown into such solutions.

All bubble solutions intended for use as a child's toy must be non-toxic and non-irritating to skin and eyes before they can be marketed. As any child who has tasted a soap bubble can attest, however, no bubble making solution has been proposed which is palatable to the taste. Conventional bubble making solutions are, in fact, singularly distasteful. As a result, though children may be amused while trying to catch bubbles in their mouths, they soon learn that it is often better to simply watch the bubbles pop.

SUMMARY OF THE INVENTION

It is therefore an object of the present invention to provide a bubble making composition which overcomes the disadvantages associated with prior art solutions. Specifically, it is an object of the present invention to provide a bubble making solution which is not only palatable to the taste, but also flavored with one or more flavorful ingredients so that children will actually enjoy the effects of catching the bubbles in their mouths.

It is also an object of the present invention to provide a bubble making solution which has acceptable bubble formation characteristics when compared to bubble making solutions utilizing conventional surfactants.

The aforementioned objects, as well as others which will become apparent to those skilled in the art from the teachings set forth herein, are achieved by an aqueous bubble making composition which comprises a sucrose ester in an amount by weight from about 3.3% to about 5.3%, a water soluble polymer in an amount by weight of from about 11.5% to about 14.0%, sucrose in amount by weight of from about 1.8% to about 4.0%, and water in amount by weight of from about 75% to about 83%. Small amounts of additional flavorings may be added to further improve the taste of the obtained solution.

Other features of the present invention will become apparent from the following detailed description considered in conjunction with the accompanying drawings. It is to be understood, however, that the drawings are designed solely for the purposes of illustration and not as a definition of the limits of the invention, for which reference should be made to the appended claims.

DETAILED DESCRIPTION OF THE PRESENTLY PREFERRED EMBODIMENTS

The bubble making composition of the present solution is an aqueous solution which, unlike prior art solutions, does not rely upon the use of strongly distasteful ethoxylated surfactants. Throughout the specification and claims, all parts and proportions are by weight, unless otherwise stated. In an illustrative form of the present invention, a sucrose ester is utilized as the surfactant. The sucrose ester is a reaction product of sucrose and an unethoxylated fatty acid. The unethoxylated fatty acid may be at least one member selected from the group consisting of stearic/palmitic esters, stearate esters, acetylated stearate esters, monolaurate esters, and stearate/monolaurate esters. Preferably, the unethoxylated fatty acid is stearate/monolaurate acid, whereby the resulting sucrose ester is sucrose cocoate. Although sucrose ester may be present in the solution in an amount from about 3.3% by weight to about 5.3% percent by weight, it is preferred that the sucrose ester is present in the solution in an amount of from 3.5 weight percent to about 4.7 weight percent, based on the weight of the solution. It is most preferred that the sucrose ester is present in the solution in amount of from about 3.9 weight percent to about 4.3 weight percent. The most preferred sucrose ester is sucrose cocoate. Although sucrose cocoate has a slightly bitter taste, when used in moderate amounts, it serves as an excellent surfactant and its taste has been satisfactorily masked by the addition of suitable sweeteners and/or flavorings.

Other surfactants besides sucrose esters may, of course, be utilized without departing from the scope of the present invention. However, for the intended use, such surfactants must be non-toxic and have a flavor which can be adequately masked by sweeteners and flavored additives.

To provide sufficient surface tension to enable bubble formation, the solution of the present invention further includes a water soluble polymer. Water soluble polymers suitable for use in the present invention may be in a dry solid state and are preferably selected from the group consisting of gums, biopolysaccharides, and synthetic water soluble polymers.

Examples of suitable gums are those selected from the group consisting of arabic, trajacanth, karaya, shatti, locust bean, guar, psyllium seed, quince seed, agar, algin, carrageenin, furcellaran, pectin, gelatin, and larch gum.

The biopolymers useful in this invention are biopolymers produced by a process comprising the microbial transformation of a carbohydrate with a microorganism to obtain a polymeric material in respect of composition, properties and structure. Suitable carbohydrates include sugars such as pentoses or hexoses, for example glucose, sucrose, fructose, maltose, lactose, galactose, and starches, for example soluble starch, corn starch and the like. Microorganisms suitable for effecting the microbial transformation of the carbohydrates may be for example, plant pathogenic bacteria such as plant pathogens which produce extrudates on the site of lesions on infected plants. Typical of such microorganisms are the species of the genus Xanthomas. Thus, for example, a heteropolysaccharide biopolymer may be prepared from glucose by the action of *Xanthomas campestris* (XC polymer). Commercially available xanthan gum biopolymers can be obtained from Kelco Div., Merck & Co., Inc. under the trademark of "Kelzan", General Mills, Inc. under the trademark "Biopolymer XB23", and from TIC gums. Other species of Xanthomonas bacteria which are useful in preparing the biopolymers include *Xanthomonas phaseoli, Xanthomonas mulvacearn, Xanthomonas carotae, Xanthomonas translucens, Xanthomonas hederae* and *Xanthomonas papavericoli*. Other biopolymers, so-called synthetic gums, which are useful in this invention include: gum dextran synthesized by the action of the bacterium known as genus Leuconostoc Van Tieghement on sucrose, as described by Bailey et al. in U.S. Pat. No. 2,360,237; phosphorylated mannan synthesized by the action of the yeast *Hansenula holstii* NRRL-Y2448 on glucose as disclosed in U.S. Dept. of Agriculture, Agricultural Research Service, Northern Utilization Research and Development Division, Peoria, Ill., Bulletin CA-N-7, October 1958; gums produced by the action of diphtheriodic bacteria such as Arthrobacter viscous NRRL B-1973 and Arthrobacter viscous NRRL B-1797 as disclosed in Cadmus et al. in U.S. Pat. No. 3,228,855; gum produced by the action of Methylomonas mucosa as described in Finn et al. U.S. Pat. No. 3,923,782; gum produced by the action of Erwinia tahitica as disclosed in Kang et al. in U.S. Pat. No. 3,933,788; and gum produced by the action of Azotobacter indicus variety Myxogenes as disclosed in Kang et al. in U.S. Pat. No. 3,960,832.

As used in this application, the term synthetic water-soluble polymer refers to those synthesized polymers which are truly water-soluble or which are dispersible in water or other aqueous medium to form a stable colloidal suspension. Examples of suitable synthetic water soluble polymers are homopolymers, copolymers, terpolymers and polymers prepared from more than three monomeric components wherein the synthetic water soluble polymer is prepared from one or more monomers selected from the group consisting of acrylic acid and the alkali salts thereof, methacrylic acid and the alkali salts thereof, acrylamide, methacrylamide, acrylonitrile, N-vinyl-2-pyrrolidone.

For the purposes of the present invention, xanthan gum is preferred as the water soluble polymer. The xanthan gum is preferably present in the solution in amount by weight of from 11.5% to about 14.0%.

The solution of the present invention further includes an sweetener component present in amount effective to mask the taste of the surfactant. If desired, the solution may also include a flavor component. The sweetener composition is usually a monosaccharide or a disaccharide. These include sucrose, fructose, dextrose, maltose and lactose. Mixtures of sugars can also be used. Other natural or artificial sweeteners can be used. These include saccharin, cyclamates, acetosulfam, L-aspartyl-L-phenylalanine lower alkyl ester sweeteners (e.g. asparatame), L-aspartyl-D-alanine amides disclosed in U.S. Pat. No. 4,411,925 to Brennan et al., issued Oct. 23, 1983, L-aspartyl-D-serine amides disclosed in U.S. Pat. No. 4,399,163 to Brennan et al., issued Aug. 16, 1983, L-aspartyl-L-1-hydroxymethyl-alkaneamide sweeteners disclosed in U.S. Pat. No. 4,338,346 to Brand, issued Dec. 21, 1982, and the like. A particularly preferred sweetener is sucrose.

The amount of the sweetener effective in the bubble making solution of the present invention depends upon the particular sweetener used and the amount and type of surfactant selected. With a sucrose ester as the surfactant, the amount by weight of sucrose, for example, can be from 1.8% to 5.0%. For non-caloric sweeteners, the amount varies upon the sweetness intensity of the particular sweetener (from about 0.001% to 5%). In determining the amount of sugar, any sugar or other sweetener present in the flavor component is also included.

The flavor component of the present invention, if present, may include one or more flavors selected from the group of natural flavors, botanical flavors, and mixtures thereof. The term "fruit flavors" refers to those flavors derived from the edible reproductive part of a seed plant, especially one having a sweet pulp associated with the seed. Also included within term "fruit flavor" are synthetically prepared flavors made to simulate fruit flavors derived from natural sources. The term "botanical flavor" refers to those flavors derived from parts of a plant other than fruit; i.e. derived from bean, nuts, bark, roots, and leaves. Also included within the term "botanical flavor" are synthetically prepared flavors made to simulate botanical flavors derived from natural sources. Examples of such flavors include cocoa, chocolate, vanilla, and the like. Botanical oils can be derived from natural sources such as essential oils and extracts, or can be synthetically prepared.

The following non-limiting example is provided to further illustrate this invention. The designation "p/w" means parts by weight.

EXAMPLE 1

| | |
|---|---|
| 4.3 | p/w Sucrose Cocoate |
| 12.8 | p/w Xanthan Gum |
| 2.9 | p/w sucrose |
| 80.0 | p/w water |

The components may be blended in any order and are combined at room temperature. This aqueous solution is not a "specialty" bubble solution, but a regular bubble solution. Using a convention wand, one can make about 10 to 20 well-sized bubbles (as with commercial bubble solutions) with one puff of air, the bubbles having various diameters of 2 to 3 inches or more. The taste of the bubbles is palatable, but could be softened by the addition of one or more flavorings as discussed above.

While there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. An aqueous bubble making composition for use as a children's toy, comprising:

water;

a surfactant comprising a sucrose ester;

a water soluble polymer; and a sweetener, said sweetener being present in an amount sufficient to impart a sweet taste to bubbles produced from the composition, whereby bubbles produced from the composition are sufficiently palatable to be eaten by a child during play.

2. The composition of claim 1, wherein said sucrose ester is sucrose cocoate present in an amount, by weight, of from about 3.3% to about 5.3%.

3. The composition of claim 1, wherein said surfactant is sucrose cocoate present in an amount, by weight of from 3.9% to about 4.3%.

4. The composition of claim 1, wherein said water soluble polymer is a gum selected from the group consisting of arabic, tragacanth, karay, shatti, locust bean, guar, psyllium seed, quince seed, agar, algin, carrageenan, furcellaran, pectin, gelatin, and larch gum.

5. The composition according to claim 1, wherein said water soluble polymer is a biopolysaccharide.

6. An aqueous bubble making composition for use as a children's toy, comprising:

water;

a surfactant comprising a sucrose ester;

a water soluble polymer; and a sweetener present in an amount effective to confer a palatable taste to bubbles produced from the composition, wherein said sweetener is selected from the group consisting of monosaccharides, disaccharides, saccharin, cyclamates, acetosulfam, and aspartame.

7. The composition of claim 6, wherein said water soluble polymer is a biopolysaccharide.

8. The composition according to claim 7, wherein said biopolysaccharide is xanthan gum present in an amount, by weight, of from about 11.5% to 14.0%.

9. The composition according to claim 6, wherein said sweetener is sucrose present in amount, by weight, of between 1.8 and 4.0 percent.

10. The composition according to claim 6, wherein said composition further comprises at least one flavored additive selected from the group consisting of natural flavors, botanical flavors, and mixtures thereof.

11. The bubble making composition according to claim 6, wherein said water soluble polymer is present in an amount sufficient to enable said composition to form a thin layer across a wand structure passed through a surface thereof to thereby facilitate the formation of airborne bubbles therefrom.

12. A children's toy, comprising:

a receptacle defining an interior cavity containing an aqueous, bubble making solution; and a bubble forming wand disposed in said bubble making solution, wherein said bubble making solution comprises water, a surfactant comprising a sucrose ester, a water soluble polymer; and a sweetener, said sweetener being present in an amount sufficient to impart a sweet taste to bubbles produced from the solution, whereby bubbles produced from the solution are sufficiently palatable to be eaten by a child during play.

13. The toy according to claim 12, wherein said sucrose ester is sucrose cocoate present in an amount, by weight, of from about 3.3% to about 5.3%.

14. The toy according to claim 12, wherein said surfactant is sucrose cocoate present in an amount, by weight, of from 3.9% to about 4.3%.

15. The children's toy according to claim 12, wherein said water soluble polymer is a biopolysaccharide.

16. A children's toy, comprising:

a receptacle defining an interior cavity containing an aqueous, bubble making solution; and a bubble forming wand disposed in said bubble making solution wherein said bubble making solution comprises water, a surfactant comprising a sucrose ester, a water soluble polymer, and a sweetener present in an amount effective to confer a palatable taste to bubbles produced from the solution; and wherein said sweetener is selected from the group consisting of monosaccharides, disaccharides, cyclamates, acetosulfam, and aspartame.

17. The toy according to claim 16, wherein said water soluble polymer is a gum selected from the group consisting of arabic, tragacanth, karay, shatti, locust bean, guar, psyllium seed, quince seed, agar, algin, carrageenan, furcellaran, pectin, gelatin, and larch gum.

18. The toy according to claim 16, wherein said water soluble polymer is a biopolysaccharide.

19. The toy according to claim 18, wherein said biopolysaccharide is xanthan gum present in an amount, by weight, of from about 11.5% to 14.0%.

\* \* \* \* \*

(12) EX PARTE REEXAMINATION CERTIFICATE (5807th)
United States Patent
Cottone et al.

(10) Number: US 6,303,164 C1
(45) Certificate Issued: Jul. 10, 2007

(54) EDIBLE BUBBLE MAKING COMPOSITION AND CHILD'S TOY

(75) Inventors: Sam Cottone, Wooddale, IL (US); Irving Isaac Domsky, Chicago, IL (US); Hamid Hussain, Carol Streams, IL (US)

(73) Assignee: FDT Enterprises, Monroe Township, NJ (US)

Reexamination Request:
No. 90/006,522, Jan. 21, 2003

Reexamination Certificate for:
Patent No.: 6,303,164
Issued: Oct. 16, 2001
Appl. No.: 08/719,776
Filed: Sep. 25, 1996

Related U.S. Application Data

(63) Continuation-in-part of application No. 08/395,624, filed on Feb. 28, 1995, now abandoned.

(51) Int. Cl.
*A23G 3/00* (2006.01)
*A63H 33/28* (2006.01)
*B01F 17/00* (2006.01)
*C11D 1/66* (2006.01)

(52) U.S. Cl. .................. 428/104; 426/548; 426/658; 446/15; 516/18

(58) Field of Classification Search .................. None
See application file for complete search history.

(56) References Cited

U.S. PATENT DOCUMENTS

| 2,893,990 | A | | 7/1959 | Hass et al. |
| 3,275,561 | A | * | 9/1966 | Pye et al. .................. 510/138 |
| 3,443,337 | A | * | 5/1969 | Ehrlich .................. 446/19 |
| 4,511,497 | A | * | 4/1985 | Ehrlich .................. 516/14 |
| 4,966,779 | A | | 10/1990 | Kirk |
| 5,091,448 | A | | 2/1992 | Hostettler et al. |
| 5,114,723 | A | | 5/1992 | Stray-Gunderson |
| 5,391,359 | A | | 2/1995 | Patel |
| 5,478,501 | A | * | 12/1995 | Rau .................. 510/135 |

FOREIGN PATENT DOCUMENTS

JP  51-38290  3/1976

OTHER PUBLICATIONS

Food Chemistry, 3$^{rd}$ Edition, Edited by Owen R. Fennema, Copyright 1996 p. 793–800.*
Martin Glicksman, "Gum Technology in the Food Industry", Academic Press, 1969, pp. 341–349.

* cited by examiner

*Primary Examiner*—Stephen J Stein

(57) ABSTRACT

An aqueous bubble-forming composition, suitable for use as a child's toy, comprises a sucrose ester present in an amount by weight from about 3.3% to about 5.3%, a water soluble polymer in an amount by weight of from about 11.5% to about 14.0%, sweetener in amount by weight of from about 1.8% to about 4.0%, and water in amount by weight of from about 75% to about 83%. Small amounts of additional flavorings may be added to further improve the taste of the obtained solution.

EX PARTE REEXAMINATION CERTIFICATE ISSUED UNDER 35 U.S.C. 307

THE PATENT IS HEREBY AMENDED AS INDICATED BELOW

AS A RESULT OF REEXAMINATION, IT HAS BEEN DETERMINED THAT:

Claims 1–19 are cancelled.

\* \* \* \* \*